United States Patent [19]

Zajacek et al.

[11] 3,879,467

[45] Apr. 22, 1975

[54] CATALYTIC OXIDATION OF ALKANES AND ALKENES WITH ORGANIC HYDROPEROXIDES

[75] Inventors: John G. Zajacek, Strafford, Pa.; Lawrence J. Carr, Mayfield Heights, Ohio

[73] Assignee: Atlantic Richfield Company, Los Angeles, Calif.

[22] Filed: Jan. 5, 1973

[21] Appl. No.: 321,499

[52] U.S. Cl....... 260/586 P; 260/597 B; 260/631 R; 260/632 C
[51] Int. Cl............................................. C07c 45/00
[58] Field of Search............ 260/597 R, 597 B, 586, 260/631 R, 632

[56] References Cited
UNITED STATES PATENTS
3,351,635    11/1967    Kollar............................. 260/632 C FOREIGN PATENTS OR APPLICATIONS
874,998      7/1971    Canada................................ 260/474
1,041,946    5/1965    United Kingdom............. 260/597 R Primary Examiner—Bernard Helfin
Assistant Examiner—James H. Reamer
Attorney, Agent, or Firm—John R. Ewbank

[57] ABSTRACT

Method for the catalytic oxidation of alkanes and monoalkenes having from 3 to 20 carbon atoms in the molecule utilzing an organic hydroperoxide, such as tertiary butyl hydroperoxide in the presence of a chromium catalyst to produce alcohols and ketones as the primary products.

1 Claim, No Drawings

CATALYTIC OXIDATION OF ALKANES AND ALKENES WITH ORGANIC HYDROPEROXIDES

BACKGROUND OF THE INVENTION

This invention relates to a method for the oxidation of alkanes or alkenes having only one olefinic unsaturation in the molecule, said hydrocarbons having from 3 to 20 carbon atoms to produce the corresponding alcohols and ketones utilizing preferably tertiary butyl hydroperoxide as the oxidizing agent and in the presence of a chromium catalyst.

In the *Journal of Organic Chemistry*, Vol. 33, pages 1416 to 1441 (1968) there is a series of articles relating to the decomposition of hydroperoxides in the presence of hydrocarbons. These articles also summarize literature on this subject to that date. The articles show that alcohols and ketones are formed when a hydroperoxide is decomposed in a hydrocarbon solvent but it appears that at high hydrocarbon conversions and high rates of reaction only low yields of alcohols and ketones are obtained.

In the *Journal of American Chemical Society*, as a communication to the editor, dated July 2, 1969, pages 3992 and 3993, there is shown the metal ion catalyzed peroxide oxidation of organic substrates, in particular, a selected synthesis of imides using peracetic acid and a cobalt or manganese cataylst. In Canadian Pat. No. 874,998, issued July 6, 1971, there is shown an oxidation process for the synthesis of alpha-hydroxy esters by oxidizing an ester with an organic hydroperoxide in the presence of a metal ion, for example n-butyl isobuterate was oxidized to n-butyl alpha-hydroxy isobuterate. Various hydroperoxide and metal catalysts are shown.

In U.S. Pat. No. 3,602,012 (1971) cyclic imides are produced by contacting lactams with a hydroperoxide in the presence of a metal salt catalyst. It is clear from the foregoing discussion that the decomposition of hydroperoxides in the presence of hydrocarbons and other organic compounds and in the presence of metal salts is known. It has been found in accordance with the present invention, however, that if a particular stable hydroperoxide, such as tertiary butyl hydroperoxide is contacted with certain paraffins or monoolefins in the presence of a chromium catalyst, high yields of alcohols and ketones can be obtained at high hydrocarbon conversion levels which critical features apparently have not been clearly demonstrated in the prior art.

SUMMARY OF THE INVENTION

In accordance with this invention, hydrocarbons either straight chain, branched chain or cyclic having from 3 to 20 carbon atoms or monoolefins which likewise may be either straight chain, branched chain or cyclic having from 3 to 20 carbon atoms can be oxidized to a product composed principably of the corresponding alcohols and ketones by the use of tertiary butyl hydroperoxide in the presence of a chromium catalyst at relatively low temperatures. The advantage of this process is that very little or no acids are obtained from further oxidation of alcohol and ketones by the hydroperoxide. This is particularly true in view of the fact that the reaction proceeds readily at low temperatures. Oxidation to acids on the other hand is a major problem in direct air oxidation of hydrocarbons. An additional advantage of the instant process is that the reaction from the standpoint of converting the hydroperoxide to the alcohol is quantitative such that with tertiary butyl hydroperoxide, for example, little or no acetone is produced. This is contrary to the result when thermal decomposition of hydroperoxide to the alcohol is attempted. As stated the reaction can be at low temperatures, i.e. 80° C. to 110° C. and thus even hydrocarbons like propane or n-butane whose critical temperatures are low, i.e. 97° C. and 152° C., respectively, can be oxidized conveniently in solution.

It is an object of this invention therefore to provide a method for the production of alcohols and ketones from alkanes or monoalkenes.

It is another object of this invention to provide a method for the oxidation of alkanes or monoalkenes to alcohols and ketones in the liquid phase utilizing an organic hydroperoxide and a chromium catalyst.

It is another object of this invention to provide a method for the production of alcohols and ketones while minimizing or substantially eliminating the production of acids from alkanes or monoalkenes by oxidation of such hydrocarbons with tertiary butyl hydroperoxide in the presence of a chromium catalyst.

Other objects of this invention will be apparent from the description of the invention which follows and from the claims.

DESCRIPTION OF THE INVENTION

The hydrocarbons which can be oxidized in accordance with the method of this invention are the straight chain, branched chain or cyclic alkanes having from 3 to 20 carbon atoms, e.g. propane, n-butane, n-pentane, n-hexane, n-heptane, n-octane and the like, including higher alkanes such as n-decane, n-dodecane, tridecane and on up to those having 20 carbon atoms. Those having from 11 to 14 carbon atoms, for example, are particularly valuable when oxidized to alcohols since they can be utilized in the production of synthetic detergents by using them to alkylate benzene producing the straight chain $C_{11}$–$C_{14}$ alkylbenzenes. The branched chain compounds are completely suitable for oxidation, for example, the iso compounds, the di-substituted compounds, such as 2,3-dimethylbutane and the like. Another group of hydrocarbons which can be oxidized by the method of this invention to give valuable products are the cycloparaffins such as cyclohexane to give cyclohexanol and cyclohexanone, both of which are valuable for the starting materials for the production of a variety of compounds. Thus cyclohezanone can be utilized in the sythesis of lysine, for example. Monoolefins likewise can be either straight chain, branched chain or cyclic and it is surprising that under the conditions employed in the instant process utilizing a chromium catalyst it is possible to produce the ketone predominantly instead of the epoxide which is produced if a molybdenum catalyst is employed. It is necessary of course that the allylic position of the olefin be amenable to oxidation, thus cyclohexene gives the alpha-beta unsaturated cyclohexanone whereas with a molybdenum catalyst the epoxide is obtained.

Although various organic hydroperoxides can be used to oxidize the hydrocarbons discussed hereinbefore to produce alcohols and ketones, tertiary butyl hydroperoxide is preferred since it gives the higher yields at higher conversions. Moreover tertiary butyl hydroperoxide is available commercially in the quantities which would be required in the instant process. It is produced by the thermal non-catalytic oxidation of isobutane, the isobutane oxidate, however, not only contains tertiary butyl hydroperoxide but also an appreciable quantity of tertiary butyl alcohol. It is unnecessary to separate the tertiary butyl alcohol from the tertiary butyl hydroperoxide in the oxidate product (the unreacted isobutane is generally stripped from the oxidate, ordinarily by the use of tertiary butyl alcohol), and thus, since the tertiary butyl hydroperoxide decomposes to tertiary butyl alcohol in the oxidation reaction, it is a relatively simple matter to recover the entire tertiary butyl alcohol fraction for use either as such or by dehydration it can be converted to isobutylene, a valuable monomer.

It has been found in accordance with this invention that chromium catalysts are superior to other metal catalysts known to decompose hydroperoxides. For example in the experimental work on this invention chromium catalysts have been found superior to catalysts containing platinum, palladium, rhenium, thallium, thorium, manganese, cobalt, iron, zirconium, nickel, zinc, cesium, copper, antimony, bismuth, lead, arsenic, molybdenum, vanadium, tungsten and titanium. In general these other catalysts either gave low hydroperoxide conversions or low product yields or both, while some gave high conversions almost no product yields were obtained. On the other hand with the preferred chrominum catalysts, for example, chromium acetyl acetonate, hydroperoxide conversions of from 80 to 100 per cent were obtained with product yields of about 60 mole per cent of alcohol and ketone based on the hydroperoxide converted assuming 1 mole of hydroperoxide is required per mole of alcohol and 2 moles of hydroperoxide required per mole of ketone.

In addition it was found that the chromium catalysts could be utilized at much lower temperatures than any of the other aforementioned catalysts tried, namely, chromium catalysts are preferably used in the range of about 80° C. to 110° C. By operating at the lower temperatures the tendency is to give higher selectivities of the desired products and in addition there is less danger that the hydroperoxide will decompose in an undesirable manner. Reaction times are dependent upon the particular hydrocarbon being oxidized and the temperature level being employed as well as catalyst level. In general time ranging from 0.5 to 10 hours are satisfactory.

No attempt was made to optimize the quantity of catalyst since the concentrations found suitable for laboratory work most frequently are not optimum for plant scale operation because of the difference in wall surface to volume ratios, degree of mixing and the like. In general, however, the amounts found suitable are the ordinary catalytic amounts associated with the decomposition of hydroperoxides, i.e. from about 50 parts per million by weight of the catalyst to 10,000 parts per million by weight of the catalyst based on the weight of the reaction mixture.

In general, it is preferred to have a stoichiometric excess of the hydrocarbon over the hydroperoxide. In producing the alcohol 1 mole of hydroperoxide is required per mole of alcohol produced assuming no loss and in producing the ketone 2 moles of the hydroperoxide are required. Since the hydroperoxide is the expensive reagent it is preferred to have it converted as completely as possible and since any uncoverted hydrocarbon can be readily recycled it is preferred to have the hydrocarbon in excess for example from 2 to 10 moles or more of hydrocarbon per mole of hydroperoxide.

As has been pointed out since tertiary butyl hydroperoxide is produced commercially by the non-catalytic oxidation of isobutane with molecular oxygen, there also is produced appreciable quantities up to equimolar amounts of tertiary butyl alcohol. It has been found that the tertiary butyl alcohol can be allowed to remain in the tertiary butyl hydroperoxide and may in some instances provide a beneficial effect as a solvent.

As has been pointed out, although the process of this invention is preferably carried out at temperatures of from 80° C. to 110° C. which may be well below the boiling point of some hydrocarbons it frequently is necessary to employ super-atmospheric pressure in order to maintain the liquid phase reaction required for the best results of this invention.

The following Examples are provided for additional illustrations of the invention, but are not to be construed as limiting.

EXAMPLE I

Three runs were carried out on the oxidation of 2,3-dimethylbutane with tertiary butyl hydroperoxide in the presence of various metal catalysts. In all runs 3.3 grams of dimethylbutane was employed together with 1.5 grams of tertiary butyl hydroperoxide and 1.5 grams of tertiary butyl alcohol. The reaction temperature was 108° C. and the reaction time was 5 hours. The results are shown in Table I.

TABLE I

| Catalyst | gm | Hydro-peroxide, Conv. % | Alcohol, Yield % |
|---|---|---|---|
| Mo(CO)$_6$ | .0085 | 70 | 43 |
| Chromium Acetylacetonate | .0080 | 100 | 47$^a$ |
| Vanadium Acetylacetonate | .0084 | 41 | 43 |

$^a$This yield corresponds to 18.5 weight per cent hydrocarbon conversion.

It will be seen that the chromium catalyst gives both a superior conversion of the hydroperoxide and a higher yield of the alcohol.

EXAMPLE II

Runs were carried out on the oxidation of cyclohexane with tertiary butyl hydroperoxide in the presence of various metal catalysts to produce cyclohexanol and cyclohexanone. There were 3.9 grams of cyclohexane, 1.5 grams of tertiary butyl hydroperoxide and 1.5 grams of tertiary butyl alcohol employed in each run at a temperature of 108° C. for the times shown in Table II.

TABLE II

| Catalyst (gm) | Time (hr) | Hydroperoxide Conversion % | Product Yield % | moles ketone / moles alcohol |
|---|---|---|---|---|
| Chromium Acetylacetonate (.008) | 2 | 97 | 64[a] | .0040 / .0021 |
| Mo(CO)$_6$ (.008) | 3 | 75 | 36 | .0017 / .0008 |
| Vanadium powder (.005) | 3 | 54 | 55 | .0020 / .0006 |
| Chromium Acetyacetonate (.004) | 3 | 82 | 65[b] | .0035 / .0013 |
| Mo(CO)$_6$ (.004) | 3 | 51 | 49 | .0015 / .0008 |
| Vanadium powder (.002) | 3 | 41 | 56 | .0015 / .0006 |

[a]This yield corresponds to a 13 per cent hydrocarbon conversion.
[b]This yield corresponds to a 10.5 per cent hydrocarbon conversion.

Again chromium is shown to be the superior catalyst with respect to conversion and yield.

EXAMPLE III

Runs similar to those in Examples I and II were carried out on the oxidation of octane with tertiary butyl hydroperoxide and molybdenum and chromium catalysts. In each run 50 ml of octane and 1.8 grams of tertiary butyl hydroperoxide were employed for the times and temperatures shown in Table III.

TABLE III

| Catalyst (gm) | Temp. °C. | Time (hr) | Hydroperoxide Conversion % | Product Yield % |
|---|---|---|---|---|
| Mo(CO)$_6$ | 110 | 2¾ | 57 | 37 |
| Chromium Acetylacetonate (.013) | 100 | 0.9 | 95 | 64 |

Again chromium is shown to be the superior catalyst.

EXAMPLE IV

Runs were carried out on the oxidation of cyclohexane with tertiary butyl hydroperoxide and various metal catalysts to produce the corresponding alcohol and ketone. The reagents were 3.9 grams of cyclohexane, 1.5 grams of tertiary butyl hydroperoxide and 1.5 grams of tertiary butyl alcohol using a reaction temperature of 108° C. for the times shown in Table IV.

TABLE IV

| Catalyst (gm) | Time (hr) | Hydroperoxide Conversion % | Yield % Product |
|---|---|---|---|
| Manganous Acetylacetonate (.0025) | 2 | 57 | 43 |
| Ruthenium oxide (.004) | 1 | 52 | 44 |
| .5% Ruthenium on alumina (pellets) | 2 | 100 | 45 |
| Palladium acetate (.0051) | 2 | 71 | 41 |
| Chloro platinic acid (.004) | 2 | 36 | 42 |

In comparing these results with those in Example II it will be seen that chromium is the superior catalyst.

In all of the foregoing Examples and succeeding Examples the hydroperoxide conversion is based on the amount charged and the product yield where not specified was calculated on the basis that 1 mole of hydroperoxide is required to produce 1 mole of alcohol and 2 moles of hydroperoxide are required to produce 1 mole of ketone.

EXAMPLE V

A series of runs were carried out to show the ketonealcohol ratio using various catalyst concentrations. The reagents for the runs shown in Table V were 3.8 grams of cyclohexane, 1.5 grams of 92 per cent tertiary butyl hydroperoxide and 1.5 grams of tertiary butyl alcohol.

TABLE V

| Catalyst (g) | Time (hr) | Hydroperoxide Conversion % | Product Yield % | Ketone Alcohol (mole 10$^3$) |
|---|---|---|---|---|
| Cr (AcAc)$_3$ *(.003) | 2 | 70 | 67 | 3.2 / 0.8 |
| Cr (AcAc)$_3$ (.004) | 3 | 82 | 65 | 3.5 / 1.3 |
| Cr (AcAc)$_3$ (.008) | 2 | 97 | 64 | 4.0 / 2.1 |
| Cr (AcAc)$_3$ (.010) | 2 | 100 | 62 | 3.7 / 2.2 |
| Cr (AcAc)$_3$ (.015) | 2 | 100 | 59 | 3.4 / 2.3 |

*Chromium acetylacetonate

The data show that the highest ratio of ketone to alcohol is obtained with the smallest amount of catalyst. This would indicate that a large quantity of the ketone is formed by direct non-catalyzed reaction between the hydroperoxide and the alcohol that is formed. In order to demonstrate this a 2 hour run was made with cyclohexanol and tertiary butyl hydroperoxide at 108° C. with no catalyst present. There was an 83 per cent conversion of the hydroperoxide and a 78 per cent yield of the cyclohexanone. Accordingly, therefore in order to direct the oxidation reaction in favor of the alcohol larger amounts of the catalyst should be employed.

EXAMPLE VI

Another series of runs were carried out varying the concentration of the tertiary butyl hydroperoxide to show the effect of hydrocarbon conversion on yield.

The results are shown in Table VI. In each run the reagents were 3.8 grams of cyclohexane. The amount of hydroperoxide shown (tertiary butyl hydroperoxide) was 1.5 grams of tertiary butyl alcohol and 0.08 grams of chromium acetylacetonate catalyst. All runs were for 2 hours at 108° C.

TABLE VI

| TBHP (g) | Hydroperoxide Product Conv. % | Alcohol Yield % | Ketone carbon (mole 10³) | Hydro- Conv. % |
|---|---|---|---|---|
| 1.5 | 97 | 64 | 4.0 / 2.1 | 13 |
| 2.0 | 98 | 58 | 4.8 / 2.1 | 15 |
| 2.5 | 97 | 61 | 6.4 / 2.3 | 19 |
| 3.0 | 96 | 46 | 5/9 / 1.7 | 16 |

It will be seen that 2.5 grams of tertiary butyl hydroperoxide gave the maximum amount of hydrocarbon conversion with a good ratio of ketone to alcohol.

EXAMPLE VII

A series of runs were carried out on 300 ml of n-butane using the reagents and conditions shown in Table VII together with the results set forth in that Table.

TABLE VII

| TBHP$^a$ (g) | TBA$^b$ (g) | Cr(AcAc)$_3$$^c$ (g) | Temp.-Time (°C) (hr) | TBHP Conv. % | Yield %$^d$ | Hydrocarbon conv. % |
|---|---|---|---|---|---|---|
| 134 | 192 | .3 | 107 – 3 | 72 | 54 | 10 |
| 134 | 192 | .6 | 100 – 3 | 69 | 44 | 8 |
| 134 | 192 | .6 | 107 – 3 | 91 | 47 | 10 |
| 67 | 96 | .3 | 108 – 3 | 84 | 69 | 7 |
| 67 | 96 | .3 | 107 – 3 | 90 | 64 | 7 |

$^a$Tertiary butyl hydroperoxide
$^b$Tertiary butyl alcohol
$^c$Chromium acetylacetonate
$^d$Product is 2-butanol and methyl ethyl ketone These results show that n-butane can be oxidized by the method of this invention to give good yields of the alcohol and ketone.

EXAMPLE VIII

A number of runs were carried out on 225 ml of propane utilizing tertiary butyl hydroperoxide and the other reagents and catalysts shown in Table VIII. The results are also shown in the Table.

TABLE VIII

| TBHP$^a$ (g) | TBA$^b$ (g) | Cr(AcAc)$_3$$^c$ (g) | Temp. (°C) | Time (hr) | Hydroperoxide Conv. % | Acetone Yield % |
|---|---|---|---|---|---|---|
| 95 | 95 | .5 | 106 | 3 | 98 | 40 |
| 95 | 95$^b$ | .1 | 90 | 3 | 83 | 26 |
| 95 | 95$^b$ | .5 | 90 | 3 | 96 | 40 |
| 95 | 95 | .5 | 90 | 5 | 94 | 53 |
| 95 | 95 | .2 | 106 | 3 | 69 | 44 |
| 95 | 95 | .5 | 100 | 3 | 88 | 26 |

$^a$Tertiary butyl hydroperoxide.
$^b$Tertiary butyl alcohol.
$^c$Chromium acetylacetonate.

The foregoing Examples show that the method of this invention can be employed to produce alcohols and ketones in excellent yields at high conversions and that chromium is the superior catalyst for such method.

We claim:

1. The method for the catalytic oxidation of hydrocarbons to form alcohols and ketones which comprises contacting at a temperature of from 80°C. to 110°C., said hydrocarbon with liquid tertiary butyl hydroperoxide in the presence of from about 50 to about 10,000 ppm of chromium acetylacetonate and the hydrocarbon is selected from the group consisting of 2,3-dimethylbutane, cyclohexane, octane, n-butane, propane, and mixtures thereof.

* * * * *